June 13, 1950     R. J. POGORZELSKI     2,511,219
VOLTAGE REGULATOR
Filed April 17, 1948
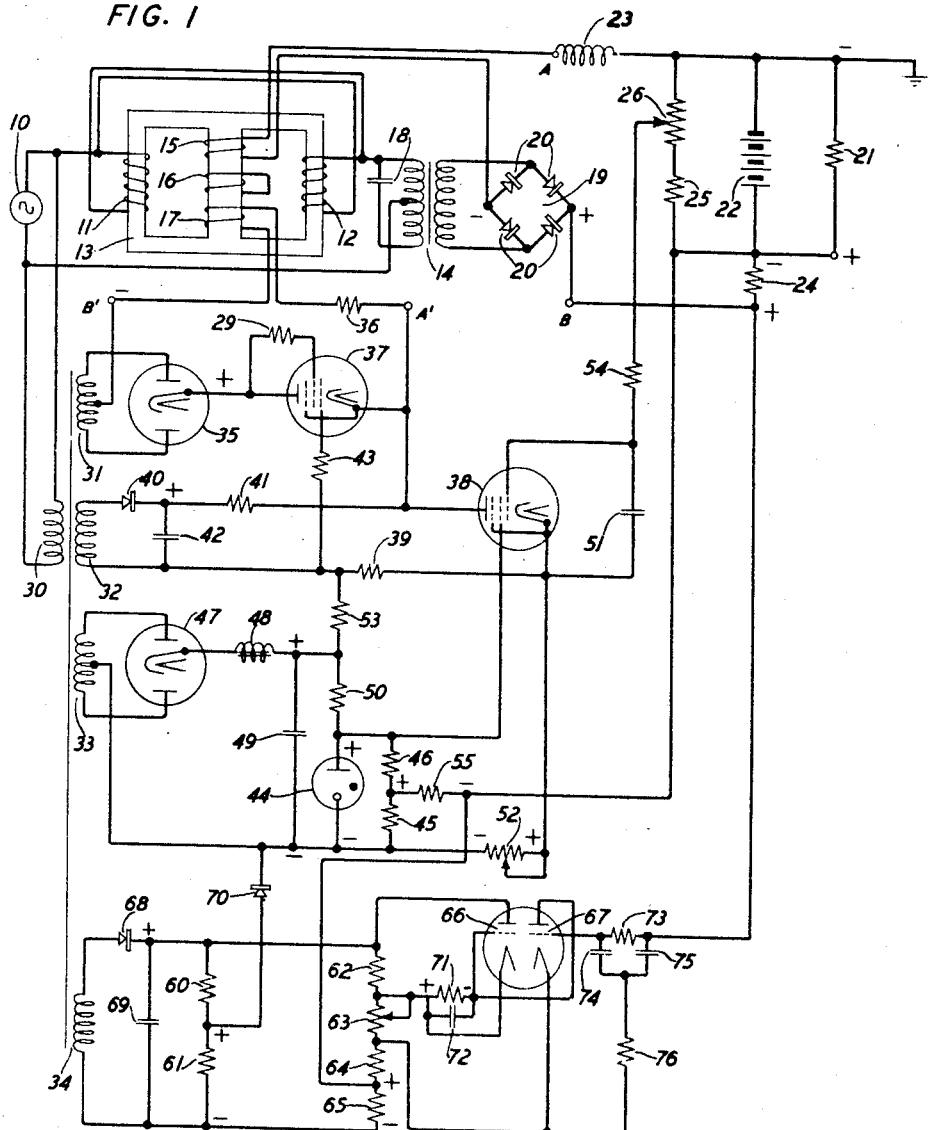
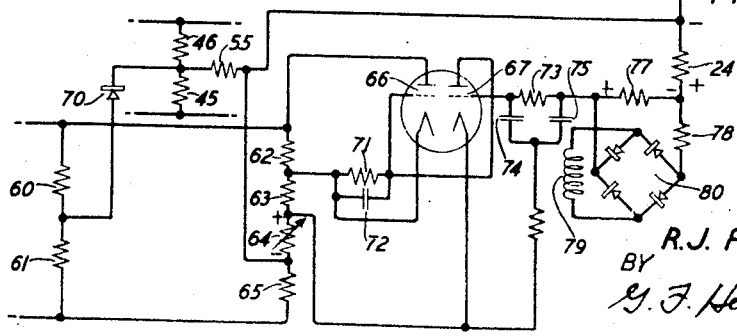
INVENTOR
R. J. POGORZELSKI
BY
G. F. Heuerman
ATTORNEY Patented June 13, 1950

2,511,219

UNITED STATES PATENT OFFICE 2,511,219

VOLTAGE REGULATOR

Roman J. Pogorzelski, Detroit, Mich., assignor to Donald R. Middleton and Stanley M. Hanley, doing business as Power Equipment Company, Detroit, Mich., a copartnership Application April 17, 1948, Serial No. 21,579

7 Claims. (Cl. 323—22)

This invention relates to voltage regulation and particularly to a regulated rectifying apparatus which is protected against overloading.

An object of the invention is to provide improved apparatus for limiting the current supplied to a load to a certain maximum amplitude and for minimizing load voltage changes when the load current is within a normal amplitude range below said maximum amplitude.

In a specific embodiment of the invention herein shown and described for the purpose of illustration, current from an alternating current source is supplied through a saturable reactor to a rectifier which, in turn, supplies direct current through a first saturating winding of the saturable reactor to a load. Current is supplied from a source of direct current to a second saturating winding of the saturable reactor through the space current path of a regulator space current device the resistance of which is varied in response to voltage changes produced at the output of a space discharge amplifier. When the load current is within a normal operating range, there is impressed upon the input circuit of the amplifier a voltage proportional to the load voltage and, in opposition thereto, a substantially constant voltage so that, when the load voltage rises, for example, the reactance of the saturable reactor is increased for causing the rise of load voltage to be minimized, and vice versa. When the current supplied to the load increases to a value above the maximum amplitude of the normal operating range, an additional voltage component is impressed upon the input circuit of the amplifier for limiting the amplitude of the load current. For this purpose there is provided a bridge circuit having input terminals connected to a source of direct current for supplying current through an asymmetrically conducting element to a resistor connected in the amplifier input circuit. There are provided a space current device, the space current path of which is connected in one of the arms of the bridge circuit and means for controlling the resistance of said space current path in response to amplitude changes of the current supplied to the load.

The invention will now be described in greater detail with reference to the accompanying drawing in which Fig. 1 is a diagrammatic view of a regulated rectifier embodying the invention. Fig. 2 is a diagrammatic view of a modification of a portion of Fig. 1.

Current is supplied from an alternating current supply source 10 through windings 11 and 12 in parallel of a saturable reactor 13 to a portion of the primary winding of a transformer 14. The saturable reactor comprises the windings 11 and 12 wound upon the two outer legs, respectively, of a three-legged core and windings 15, 16 and 17 on the middle leg, the winding 16 being short-circuited. The winding 16 is included to minimize the alternating voltages induced in windings 15 and 17 due to an unbalance in windings 11 and 12, if any. A 10-microfarad condenser 18 is connected across the primary transformer winding. The secondary winding of transformer 14 is connected to the input terminals of a bridge type, full wave rectifier 19 comprising selenium rectifying elements 20. Rectified current is supplied from rectifier 19 to a load 21, which may comprise a storage battery 22 connected across the load terminals, through a circuit comprising an inductive reactor 23, winding 15 of the saturable reactor 13 and 0.02-ohm resistor 24, all in series. A 9100-ohm resistor 25 and a 10,000-ohm potentiometer 26 in series are connected across the load.

There is provided a transformer having a primary winding 30 and secondary windings 31, 32, 33 and 34. A full wave rectifier comprising transformer winding 31 and a rectifier space current tube 35 which may be of the type designated 6X5GT/G supplies unidirectional current to saturating winding 17 through a circuit comprising in series a 100-ohm resistor 36 and the space current path of a regulator space current device 37 which may be of the 6L6GA type. The screen grid of tube 37 is connected to the anode by a path including a 47-ohm resistor 29. An amplifier comprising a space discharge device 38 which may be of the 6AC7 type is provided for controlling the resistance of the space current path of tube 37. Rectified current is supplied to the space current path of tube 38 through a path comprising 20,000-ohm resistor 39, transformer winding 32, asymmetrically conducting element 40 and 0.1-megohm resistor 41. A filtering one-microfarad condenser 42 is connected across winding 32 and rectifying element 40 in series. The cathode of tube 37 is directly connected to the anode of tube 38 and the control electrode of tube 37 is connected through a 0.1-megohm resistor 43 to the negative output terminal of rectifier 32, 40, that is to the common terminal of winding 32, condenser 42 and resistor 39.

A circuit is provided for setting up a relatively constant voltage across a cold cathode, gas-filled tube 44 and across a 330-ohm resistor 45 of a voltage divider consisting of resistor 45 and 10,000-ohm resistor 46 in series connected across the tube 44. For setting up this relatively constant reference voltage there are provided a full wave rectifier comprising transformer winding 33 and a rectifying tube 47 which may be of the 6X5GT/G type, a ripple filter comprising a series inductance element 48 and a one-microfarad shunt condenser 49 and a 7000-ohm resistor 50 through which the rectified current is supplied to the tube 44. The tube 44 has the characteristic that its resistance increases as the current flowing through it decreases, and vice versa, so as to maintain the voltage across it substantially constant, voltage variations across the rectifier output filter being taken up by the resistor 50. The positive terminal of tube 44 is connected to the screen grid of tube 38. A 0.1-microfarad condenser 51 is provided in a path connecting the control grid and cathode of tube 38. The cathode of tube 38 is connected through 1,000-ohm variable, line voltage compensating resistor 52, resistor 45 and 4700-ohm resistor 55 to the positive load terminal. This cathode is also connected through resistor 39 and 34,000-ohm resistor 53 to the positive output terminal of rectifier 47 and filter 48, 49. The control electrode of tube 38 is connected through 0.1-megohm resistor 54 to the variable tap of potentiometer 26.

The operation of the circuit, as thus far described, may be explained as follows: The current which is supplied to the load 21, 22 from rectifier 19 flows through saturating winding 15 of saturable reactor 13 so that an increase of load current, for example, lowers the reactance of reactor windings 11 and 12 to prevent or minimize a rise of voltage drop across reactor windings 11 and 12 due to the increased current flowing therethrough. The control grid-cathode voltage of tube 38 comprises the portion of the load voltage which appears across resistor 25 and a portion of potentiometer 26, the voltage drop across resistor 45 and the voltage drop across resistor 52, the voltage drop across resistor 45 being in opposition to the other two voltage components. The voltage drop across resistor 52, which increases in response to an increase of voltage of source 10 and of the resulting increase of output voltage of rectifier 47, for example, tends to compensate for changes of anode and cathode heater voltages for tubes 37 and 38, which voltages are derived from the source 10. If the load voltage should rise, for example, the control grid of tube 38 will become relatively more negative to cause its space current and the voltage drop across resistor 41 to decrease. Therefore, the control grid of regulator tube 37 will also become relatively more negative with respect to its cathode and the current supplied to saturating winding 17 will decrease. The reactance of windings 11 and 12 is thus increased to cause the initially assumed rise of load voltage to be minimized.

For the purpose of limiting the load current to a safe maximum amplitude, a circuit arrangement responsive to load current is provided for causing direct current to flow through resistor 55 only when the load current exceeds a predetermined amplitude. The resulting voltage drop across resistor 55 is in aiding relationship with respect to the voltage drop across resistor 52 and with respect to that across resistor 25 and a portion of potentiometer 26 in the control grid-cathode circuit of tube 38. The circuit arrangement comprises a bridge circuit having 15,000-ohm resistor 60 and 8200-ohm resistor 61 in series in one of two parallel branch paths and having 0.1-megohm resistor 62, 10,000-ohm variable resistor 63, 680-ohm resistor 64 and 12,000-ohm resistor 65, all in series, in the second branch path. There is also provided a twin triode tube, which may be of the 6SN7GT type, having triodes 66 and 67. The bridge circuit also comprises the anode-cathode path of triode 66 which is connected across resistor 62. A circuit is provided for impressing a unidirectional voltage across the input terminals of the bridge, said circuit comprising secondary transformer winding 34, an asymmetrically conducting element 68 and a 10-microfarad filtering condenser 69. The output bridge terminal which is the common terminal of resistors 60 and 61 is connected through an asymmetrically conducting element 70 to the common terminal of resistors 45 and 52. The other output bridge terminal which is the common terminal of resistors 64 and 65 is connected to that terminal of resistor 55 which is connected to the positive terminal of load 21. Anode current is supplied to the triode 67 due to the voltage drop across resistor 63, the cathode of the triode being connected to the common terminal of resistors 63 and 64 and the anode being connected through a 0.1-megohm resistor 71, shunted by one-microfarad condenser 72, to the common terminal of resistors 62 and 63. The control grid of triode 66 is connected to the common terminal of resistor 71 and the anode of triode 67. The control electrode-cathode circuit of triode 67 may be traced from the control electrode through 0.1-megohm resistor 73, resistor 24 and resistor 64 to the cathode. Resistor 73 is shunted by one-microfarad condensers 74 and 75 in series, the common terminal of the condensers being connected through 22,000-ohm resistor 76 to the cathode of triode 67.

As the current supplied to the load is increased, the voltage drop across resistor 24 increases so as to make the control grid of triode 67 relatively less negative with respect to its cathode, thus causing the anode current of the triode and the voltage drop across resistor 71 to increase. The control grid of triode 66 thus becomes relatively more negative with respect to its cathode to cause the resistance of the space current path of triode 66 to increase. The current flowing through resistors 63, 64 and 65 is thus decreased to cause a decreased voltage drop across resistor 65. It will be noted that when the voltage drop across resistor 24 increases, for example, the voltage drop across resistor 64 will decrease so that the voltage changes across resistors 24 and 64 are cumulative in their effect upon grid-cathode voltage of triode 67. When the load current has increased to a certain predetermined amplitude, the voltage across resistor 65 is less than the voltage across resistor 61 and the algebraic sum of the voltages across resistors 65 and 61, respectively, is larger than the reference voltage across resistor 45. Under this condition, current flows from the positive terminal of rectifier 34, 68 through resistor 60, through the asymmetrically conducting element 70 in its low resistance direction and through resistors 45, 55 and 65 to the negative terminal of rectifier 34, 68. This current flow through resistor 55 introduces an additional voltage component into the control grid-cathode circuit of tube 38 of polarity opposed to the voltage across resistor 45 but aiding to the voltages across resistors 52, 25 and a portion of potentiometer 26. The control grid of tube 38 thus becomes more negative with respect to its cathode as the load current increases above its normal amplitude range. As a result the reactance of reactor 13 is increased to limit the current supplied to the load.

In some applications it may be preferred to utilize the space current path of a space current device for directly controlling the current supplied from a direct current source to a load. In such a modification, for example, the reactor 13, transformer 14 and rectifier 19 may be omitted and terminal A' connected to terminal A and terminal B' connected to terminal B. In this modification, rectifier 31, 35 will supply current to the load through the space current path of regulator tube 37.

Fig. 2 is a modification of a portion of Fig. 1, the same numerals being used to designate similar elements in the two figures. In Fig. 2, the output voltage of the bridge circuit 60, 61, 62, 63, 64, 65 is impressed across asymmetrically conducting element 70 and resistor 55 in series, the resistor 45 being excluded from this circuit while in Fig. 1 it is included. In Fig. 2 an additional voltage is provided in the control grid-cathode circuit of triode 67, this voltage being set up across a resistor 77 in response to current supplied thereto from the output of a bridge type rectifier 80 through a resistor 78. Alternating current to be rectified is supplied to the input of rectifier 80 from a secondary winding 79 of a transformer the primary winding 30 (Fig. 1) of which is connected to the alternating current source 10. In this arrangement the voltage set up across resistor 55 is independent of the voltage across resistor 45. Resistor 64 may be adjusted so that the voltage across resistor 65 becomes less than the voltage across resistor 61 when the load current flowing through resistor 24 has increased to a desired value. The provision of the additional voltage across resistor 77 in the grid-cathode circuit of triode 67 makes the circuit more sensitive in that it permits the circuit to function in response to a smaller voltage across resistor 24, thus permitting a resistor 24 of smaller resistance to be used. Moreover, this added voltage provides compensation for line voltage changes, an increase of line voltage causing the current through resistor 65 to decrease just as an increase of load current flowing through resistor 24 causes the current through resistor 65 to decrease. Thus when the load current is at or near the maximum amplitude of the normal operating range, an increase of line voltage will cause current to flow through resistor 55 to cause the load current to be limited.

The invention is also applicable to a regulated rectifier in which gas-filled, grid controlled rectifier tubes are employed for supplying rectified current to a load, the load current and voltage being controlled in response to a control voltage impressed upon the control electrode-cathode circuits of the rectifier tubes.

In another modification, the current supplied by a direct current generator to a load circuit, such as load 21 and resistor 24 in series, may be controlled by supplying the output current of rectifier 19 to a shunt field winding of the generator.

What is claimed is:

1. The combination with means for supplying current from a current source to a load, of a space current device having an anode, a cathode and a control electrode, a source of space current for said device, means under control of the space current in said device for controlling the current supplied to said load, a circuit connecting the control electrode and cathode of said device, a resistor in said circuit, means for impressing upon said circuit a voltage having variations corresponding to load voltage changes for causing the load voltage changes to be minimized when the load current is within a normal operating range, a first and a second source of direct voltage, an asymmetrically conducting element, a circuit comprising in series said asymmetrically conducting element, said resistor and said first and second direct voltage sources in opposition with respect to each other, and means for controlling the voltage of one of said direct voltage sources in response to load current changes to cause a current to flow through said resistor when the load current is greater than the maximum normal operating current only, thereby limiting the current supplied to the load.

2. In combination, a space current device having an anode, a cathode and a control electrode, a circuit connecting said anode and said cathode having a source of space current therein, a circuit connecting said control electrode and said cathode having therein a source of control voltage for controlling the space current in said device, a resistor in said control electrode-cathode circuit, two sources of direct voltage one of which may vary, an asymmetrically conducting element, and a circuit comprising in series said resistor, said asymmetrically conducting element and said two direct voltage sources, the voltages of said sources being opposed in said circuit, current being caused to flow through said asymmetrically conducting element and said resistor only when the voltage of said variable source is within a certain voltage range to further control the space current in said device.

3. Voltage control apparatus comprising a source of direct current, a first, a second, a third and a fourth resistor, a circuit for supplying current from said source to said first, second and third resistors in series, two space current devices each having an anode, a cathode and a control electrode, means for connecting the anode-cathode path of a first of said devices across said first resistor, a circuit comprising in series said second and fourth resistors and the anode-cathode path of said second device, means for connecting the control electrode-cathode path of said first device across said fourth resistor, and means for impressing across the control electrode-cathode path of said second device a voltage for controlling the potential difference across said third resistor.

4. Voltage control apparatus comprising a source of direct current, a first, a second, a third, a fourth and a fifth resistor, a circuit for supplying current from said source to said first, second, third and fourth resistors in series, two space current devices each having an anode, a cathode and a control electrode, means for connecting the anode-cathode path of a first of said devices across said first resistor, a circuit comprising in series said second and said fifth resistors and the anode-cathode path of said second device, means for connecting the control electrode-cathode path of said first device across said fifth resistor, a circuit comprising said third resistor connecting the control electrode and cathode of said second device, and means for impressing upon said last named circuit in opposition to the potential difference across said third resistor a voltage for causing the potential difference across said fourth resistor to be controlled.

5. The combination with means for supplying direct current from a current source to a load, said current normally having an amplitude within a range of amplitudes including a certain maximum amplitude, of a space current device having an anode, a cathode and a control electrode, a source of space current for said device, means under control of the space current in said device for controlling the current supplied to the load, a circuit connecting the control electrode and cathode of said device, means for impressing upon a first portion of said control electrode-cathode circuit a first voltage component having variations corresponding to load voltage changes, means for impressing upon a second portion of said control electrode-cathode circuit a second component voltage, said second voltage component having a substantially constant amplitude and a polarity opposed to that of said first component and means for reducing the amplitude of said second voltage component in response to an increase of load current to an amplitude above the maximum amplitude of said normal operating range only.

6. In combination, a first and a second resistance means, means for supplying direct current to said first and second resistance means in series, a first and a second space current device each having an anode, a cathode and a control electrode, means for connecting the space current path of said first space current device across a first portion of said first resistance means, a third resistor, means for connecting said third resistor and the space current path of said second space current device in series across a second portion of said first resistance means, one terminal of said third resistor being connected to the anode of said second space current device, means for connecting said one terminal of said third resistor to the control electrode of said first space current device, means for connecting the other terminal of said third resistor to the cathode of said first space current device, a circuit comprising a third portion of said first resistance means connecting the control electrode and cathode of said second space current device, means for impressing a control voltage upon said last-named circuit to control the voltage across said second resistance means, and means for utilizing the voltage across said second resistance means.

7. The combination with means for supplying current from a current source to a load, said current normally having an amplitude within a range of amplitudes including a certain maximum amplitude, of means for controlling the current supplied to the load comprising a space current device having an anode, a cathode and a control electrode, a first and a second resistor, means for impressing across said first and second resistors in series a substantially constant voltage for causing current to flow through said second resistor, a third resistor, a circuit connecting said control electrode and said cathode comprising said second and third resistors in series, and means responsive only to load current having an amplitude greater than said normal maximum amplitude for causing a current to flow through said third resistor.

ROMAN J. POGORZELSKI.

REFERENCES CITED

The following references are of record in the file of this patent:

UNITED STATES PATENTS

| Number | Name | Date |
|---|---|---|
| 2,019,352 | Livingston | Oct. 29, 1935 |
| 2,079,500 | Foos | May 4, 1937 |
| 2,210,394 | Braden | Aug. 6, 1940 |
| 2,210,732 | Rumpel | Aug. 6, 1940 |
| 2,413,941 | Bixby | Jan. 7, 1947 |
| 2,414,242 | Potter | Jan. 14, 1947 |